Feb. 10, 1959 M. A. MOSKOVITZ 2,873,130
BALL JOINT ASSEMBLY
Filed Oct. 22, 1953
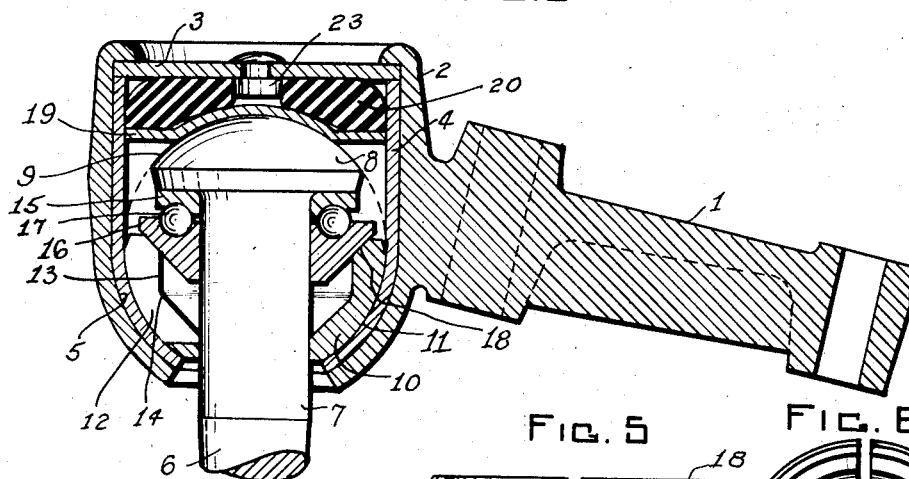
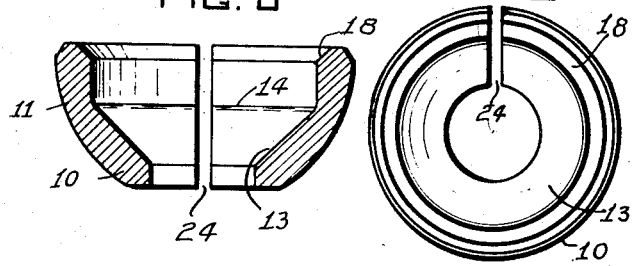
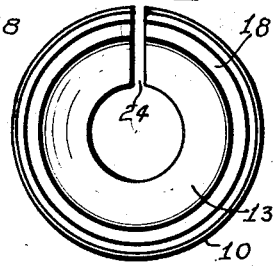
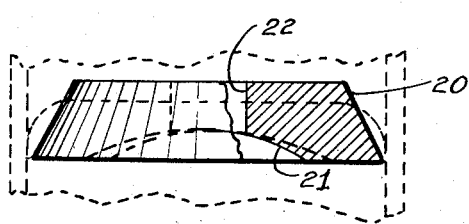
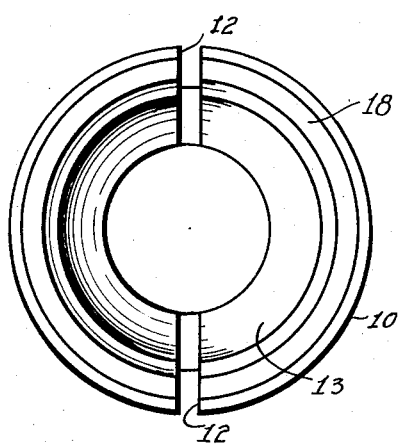
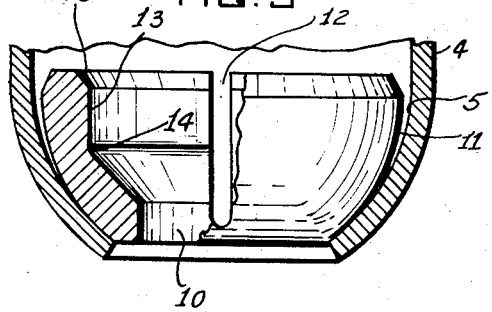
INVENTOR
MILTON A. MOSKOVITZ
By: Ben V. Zillman
ATTORNEY

United States Patent Office 2,873,130
Patented Feb. 10, 1959

2,873,130

BALL JOINT ASSEMBLY

Milton A. Moskovitz, Richmond Heights, Mo., assignor of one-half to Harry Frankel, St. Louis, Mo.

Application October 22, 1953, Serial No. 387,646

5 Claims. (Cl. 287—90)

The invention relates to ball joints generally, but more especially to such joints that are intended for use in automobiles, as for example in connection with wheel-supporting members of the latter, and has among its general objects the production of such a device that will be relatively simple and inexpensive, will have a high load-capacity so as to withstand both continuous and intermittent shock-load conditions, will have a maximum of bearing conformity between the mating bearing surfaces, will tend to remain in proper assembled relation even though wear occurs at the bearing surfaces, be long-wearing, positive and otherwise satisfactory in its action and which will be otherwise efficient for service wherever deemed applicable.

One of the principal objects of my invention is to so construct such a device that there is no unwanted looseness or play between its working parts, either initially or as wear occurs, such wear being taken up automatically so as to compensate therefor.

Another object of the invention is to so construct such a device that although there is initially a slight clearance between the cooperable bearing surfaces, there are means to yieldably deform one of said bearing elements so as to make the same be substantially complemental to the other bearing surface, and to maintain such complemental bearing engagement throughout the life of the device.

An added object of my invention is to so construct such a joint that there is a resiliently compressible means for maintaining the parts in their proper assembled relation and which will have limit means to halt further compression of said resilient means after a predetermined compression of the latter.

Many other objects and advantages of the construction herein shown and described will be obvious to those skilled in the art to which this invention appertains, as will be more clearly pointed out in the disclosures herein given.

To this end my invention consists in the novel construction, arrangement and combination of parts herein shown and described, as will be more readily understood and clearly set forth in the following specification.

In the drawings, wherein like or corresponding parts are represented by like reference numerals, Figure 1 is a cross-sectional view, taken partly in elevation, showing such a joint as a part of a ball-suspension unit;

Figure 2 is an enlarged detail of the resiliently compressible element, showing the same both in its initial shape and as compressed to its operative position;

Figure 3 is an enlarged cross-sectional detail of the pair of cooperating bearing elements before the radially-engaging means actuates the inner element to its normal operating position relatively of the other bearing element;

Figure 4 is a top plan view of said inner bearing element in its initial and undistorted form; and Figures 5 and 6 are sectional and plan views, respectively, of a modified form of bushing.

Referring more particularly to the drawings, wherein I have illustrated a preferred embodiment of my invention, there is shown one form of ball-joint that is especially intended for use in a ball-joint suspension for automobiles, a portion of the control arm of such suspension device or independently-suspended wheel structure being shown, one arm end having a socket member 2 thereat with a bore or opening axially therethrough, one end of said opening (herein shown as being at the lower end) being preferably reduced in diameter in the usual manner. The other end of said opening is adapted to have a closure 3 affixed to extend thereacross and held in place in any preferred manner, as by crimping or peening over the bounding portion of the socket onto said closure.

A bearing surface is provided at the lower end of said opening and may be made either integral therewith, or as shown may be made of a separate sleeve element 4 having the segmentally spherical or concave bearing surface 5, such element being made of any suitable preferred material.

A stud member 6 is the other of the pair of relatively movable members of the joint structure, the same having a longitudinally extending shank portion 7 that projects through the lower end of the socket after assembly, the upper portion of said shank provided with a radially enlarged head 8 which may be rounded or segmentally spherical at its top face to provide the convex bearing surface 9 and may have substantially the same curvature as the bearing surface 5 to be complemental therewith to engage the same after a predetermined degree of angular tilt of the stud relatively of the socket.

A bushing 10 is interposed in the opening between the stud and said bearing surface, being in the form of an annulus to receive said stud shank therethrough and have the major portion spaced from the latter somewhat as indicated in Fig. 1, said bushing being made of the same or a material different from said bearing surface, as preferred and dependent upon the load conditions for which the joint is designed.

The exterior of said bushing has a rounded or convex bearing surface 11 adapted to cooperably engage said bearing surface 5. However, it is to be especially noted that the initial shape of the bushing is such that said bearing surface 11 is of a greater degree of curvature than that of the surface 5, although its curvature at the lower end is approximately equal to that of the latter whereby said bushing will seat on said bearing surface 5 when inserted thereinto, somewhat as indicated in Fig. 3. Those portions of the bushing that are above its bottom edge will have an initial clearance with said surface 5, the clearance increasing progressively toward the top of the bushing.

In manufacture, the bearing surface 5 may be machined to show a plus tolerance only, say up to .003", while the cooperating bearing surface 11 should be held to a minus tolerance only, say up to .003" also, thus insuring that there will be no initial binding of said mating bearing surfaces in assembly or in operation, nor an improperly seated bushing. Thus, a maximum and effective area of bearing engagement between the parts is achieved in an inexpensive way.

It is to be stressed that the bushing is radially expandible to its proper positioning in assembled relation until its external bearing surface is substantially complemental to that of the internal bearing surface 5, to thus insure a maximum of bearing areas in contact.

In the form shown in Figs. 3 and 4, the bushing has one or more slots or slits 12 therethrough, extending downwardly from its top edge and terminating short of the bottom edge of the bushing so as to provide circumferentially spaced laterally bendable fingers with a lowermost rigid and non-expandible portion.

Although the bushing as thus made is radially expandible, further modification is made to facilitate and insure radial expansion that increases progressively to its top edge, and therefore the inner surface 13 of the bushing is cup-shaped and spaced from the stud shank for the major portion of the axial length or height of the bushing. Further, it is made to have a well-defined annularly extending line of bend or flex 14 at a point intermediate the top and bottom of the same, as by having the bushing thickness sharply reduced along this line 14.

Obviously, after the bushing is seated with its lower end on the surface 5, and the upper end pressed radially outwardly, the bushing will be yieldably deformed from its initial shape shown in Fig. 3 to its operative shape shown in Fig. 1, flexing or bending the bushing for nearly the full length of the latter and especially along its line of weakness 14 in so doing. Thus, a perfection of spherical fit is achieved between the pair of cooperating bearing surfaces at a minimum of machining cost in manufacture.

In Figs. 5 and 6, the one-piece bushing has the longitudinal slot 24 extend for the entire length of the bushing, so that when the bushing is pressed downwardly by the wedging element, it is radially enlarged at its lowermost edge as well as at all points thereabove; therefore, less radial thrust is needed adjacent the upper end of the bushing to properly expand the bushing to operative position in this form than where the slot terminates short of the bottom edge.

A wedge means for expanding the bushing is interposed between it and the stud, and in the embodiment illustrated is in the form of a pair of ball-race elements 15 and 16 encircling said stud shank and having anti-friction balls 17 therebetween, the element 15 being nearest the ball head while the element 16 is closest the bushing.

The inner surface of the bushing is provided at its upper end with an inclined surface, bevel or taper 18 smallest at its bottom, and the exterior portion of the race element 16 extends downwardly past said surface 18 to slidably engage the latter as said element 16 is actuated downwardly. Such downward movement of the element 16 will radially expand the bushing to deform it in proper complemental bearing relation with the bearing surface 5.

Suitable means may be provided for resilient maintaining all of the parts in perfect bearing relation, and in this instance includes a pressure plate 19 that is movable axially within the socket member and is limited in its lateral movement by the bounding side wall of the chamber to form a lubricant chamber between itself and the adjacent bearing assembly parts.

Said plate 19 may have its central portion concave to receive and rotatably seat the cooperating spherically rounded surface of the stud head to permit rotating and tilting of the latter in operation, said plate being movable axially within said chamber as previously noted.

Any suitable source of yieldable pressure may be interposed in the socket between said plate and closure, as for example the plug 20 made of natural or a synthetic rubber or rubber-like material, and preferably in the shape of the frustum of a cone that is of largest diameter at its bottom, said element being initially of greater height or depth than the space between said closure and plate 19. Although it is preferable that this plug prevent leakage of lubricant upwardly therepast after assembly and with lubricant in place within the chamber, it is important that the pressure of the plug radially outwardly against the bounding wall of the chamber be restricted to an amount insufficient to destroy its desired resiliency after installation into the joint, and therefore it is preferred that the diameter of the base of the plug be slightly less than the chamber thereat, so as to present only a narrow pressure band against said enclosing wall after assembly. The initial shape of the plug as illustrated in full lines in Fig. 2, and its final or operative shape as shown in dotted lines therein, bring out this feature.

Although the plug is so proportioned as to provide the requisite lateral and axial pressures upon being distorted into operative shape, yet it is sufficiently axially movable to resiliently absorb and dampen the shocks to which the joint will be subjected to in service.

Recessing of the lower side of the plug as indicated at 21 will improve its characteristics to tend to adjust the same to prevent excessive rubber-to-metal pressure and insure a relatively long life for the plug, and insures properly directed lateral and upward flow of the plug material upon compressing the latter between its top and bottom ends. This recess is therefore preferably dome-shaped and terminating adjacent the lower peripheral edge of said bottom face.

In order to make the plug even more readily expandable and free to have its material flowed to the desired portions upon compression of the plug, it is formed with a central opening 22 therethrough. A pin 23 may be positioned within said opening 22 and made of a relatively incompressible material, such as of steel and of lesser height than the thickness of the plug thereat so as to limit further compression of the plug after a predetermined amount of such compression, as it is obvious that the pin will engage both the closure and plate at the desired limit of compression movement of the plug. In addition, the entrapment of air in both the opening 22 and in the recess 21 will serve to further cushion any shock and improve the adjustment of the compression pressures.

When the joint is assembled and the cover is in place, the plug will exert a constant downward or axial thrust or pressing force on the pressure plate, which is in turn transmitted to the ball head and by it to the bushing, thus tending to maintain all of the parts in their proper operative relation.

It will be noted that when the contour of the convex surface of the ball head is on the same radius as that of the concave bearing surface 5, said surfaces will be in bearing engagement as the stud tilts, and that toward the end of tilting angle both the ball head and bushing will be maintained in bearing engagement with the bearing surface 5. Thus, there is good bearing engagement with the bearing surface 5, even in the maximum tilted position of the stud, and the bushing is constantly radially expanded to be complemental with said bearing surface 5, through the axial movement of the wedging element constantly bearing against said bushing.

I claim:

1. A joint structure comprising a socket member having an opening extending axially therethrough and having a concave bearing surface at its lower end, a stud having an enlarged head within said opening, a closure across the upper end of said socket opening, a radially expandible bushing split lengthwise therethrough and arranged between said head and bearing surface and having a convex bearing surface to oppose said first bearing surface and said convex bearing surface being of such a size that the major portion of its bearing surface is radially expanded against said concave bearing surface to a greater degree than at other portions, the bottom of said bushing seating in said concave bearing surface, said bushing being weakened to be less rigid intermediate its axial length so as to be bendable thereat about a plane substantially perpendicular to the axis thereof to deform its convex bearing surface to be substantially complementary with said concave bearing surface, and means in said socket member engaging said bushing and stud and axially actuated by the latter for expanding said bushing.

2. A joint structure comprising a socket member having an opening axially therethrough with a concave bearing surface at its lower end, a stud having an enlarged head within said opening, a closure across the upper end of said opening, a radially expandible bushing having a split extending lengthwise therethrough from its upper end to adjacent its lower end and with a convex bearing surface to tiltably engage said concave bearing surface and whose thickness is reduced intermediate its axial length to define a transverse line of bend weakness when the bushing is pressed outwardly while seated in said concave bearing surface, the unsplit lowermost portion of said bushing being substantially inexpandible and seating on said concave bearing surface, said bushing having the convex bearing surface of said upper portion yieldably expanded to substantially the same curvature as that of said concave bearing surface, and means within said socket opening engaging said bushing and stud and actuated by movement of the latter to resiliently yieldably actuate said bushing axially downwardly and radially outwardly so that its convex bearing surface is forced to be substantially complementary to that of said concave bearing surface.

3. A joint structure comprising a socket member having an opening axially therethrough with a concave bearing surface at its lower end, a stud having a radially enlarged head within said socket member, a closure across the upper end of said opening, yieldably compressible means between said closure and head to urge the latter toward said bearing surface, a bushing tiltable between said head and bearing surface and having a convex bearing surface to engage the latter, said bushing being longitudinally split to be yieldably radially expandible, the bearing surface of the bushing being yieldably radially expandable at one end only, said bushing having a downwardly extending reducingly tapered radially inward face, and axially movable means engaging between said head and bushing and actuated by said stud and slidably engaging said tapered face to urge said bushing radially outwardly.

4. A joint structure comprising a socket member having an opening axially therethrough with a concave bearing surface at its lower end, a stud having a radially enlarged head in said opening, a closure across the upper end of the opening, yieldably compressible means between said closure and head to urge the latter toward said bearing surface, a one-piece yieldably expandible bushing between said head and bearnig surface and having a convex bearing surface to tiltably engage the latter, said bushing having a longitudinally extending split for substantially the full height thereof, only a portion of the height of the bushing being yieldably expanded to form a curvature substantially complementally engaging said concave bearing surface, said bushing having an inner downwardly extending and inwardly directed tapered face, and axially movable means between said head and bushing and slidably engaging said inner tapered face to urge said bushing radially outwardly.

5. A joint structure comprising a socket member having an opening therethrough and having a concave bearing surface at one end, a closure across the other end of said opening, a stud axially movable in said socket member and having a radially enlarged head within said opening, a bushing having a lengthwise split therethrough and tiltably seated between said head and bearing surface and provided with a convex bearing surface opposed to said concave bearing surface to engage the latter, one end of said bushing being more expandible radially than the other, and axially movable wedge means engaging said bushing at said more expandible end and said head actuated by axial movement of said stud to urge radial expansion of said bushing at said end that is more expandible.

References Cited in the file of this patent

UNITED STATES PATENTS

| 1,817,916 | Britten et al. | Aug. 11, 1931 |
| 1,985,729 | Ingersoll | Dec. 25, 1934 |
| 2,160,297 | Thompson | May 30, 1939 |
| 2,507,087 | Booth | May 9, 1950 |
| 2,544,583 | Booth | Mar. 6, 1951 |
| 2,645,438 | Kalikow | July 14, 1953 |
| 2,676,045 | Moskovitz | Apr. 20, 1954 |

FOREIGN PATENTS

| 493,472 | Great Britain | Oct. 10, 1938 |
| 610,718 | Great Britain | Oct. 20, 1948 |
| 661,986 | Germany | July 1, 1938 |
| 859,701 | Germany | Dec. 15, 1952 |